United States Patent
Hofbaur et al.

(10) Patent No.: US 11,299,202 B2
(45) Date of Patent: Apr. 12, 2022

(54) SELECTIVELY RECONFIGURABLE DRIVE-ASSEMBLY

(71) Applicant: JOANNEUM RESEARCH Forschungsgesellschaft mbH, Graz (AT)

(72) Inventors: Michael Hofbaur, Graz (AT); Mathias Brandstötter, Klagenfurt (AT)

(73) Assignee: JOANNEUM RESEARCH Forschungsgesellschaft mbH, Graz (AT)

( * ) Notice: Subject to any disclaimer, the term of this patent is extended or adjusted under 35 U.S.C. 154(b) by 134 days.

(21) Appl. No.: 16/784,839

(22) Filed: Feb. 7, 2020

(65) Prior Publication Data
US 2020/0255064 A1 Aug. 13, 2020

(30) Foreign Application Priority Data
Feb. 11, 2019 (EP) ...................................... 19156465

(51) Int. Cl.
*B62D 9/00* (2006.01)
*B62D 9/04* (2006.01)

(52) U.S. Cl.
CPC ............... *B62D 9/002* (2013.01); *B62D 9/04* (2013.01)

(58) Field of Classification Search
CPC .................................. B62D 9/002; B62D 9/04
USPC ....................................................... 180/6.58
See application file for complete search history.

(56) References Cited

U.S. PATENT DOCUMENTS 5,261,500 A    11/1993   Bausch

FOREIGN PATENT DOCUMENTS

| DE | 102015209841 A1 | 12/2016 | |
| JP | 62241770 A | * 10/1987 | ............. B62D 7/026 |
| JP | S62241770 A | 10/1987 | |

OTHER PUBLICATIONS

Extended European Search Report for European Application No. 19156465.7 dated Aug. 30, 2019.
Robert Bosch GmbH, Technical Customer Information, p. 6, Dec. 10, 1998.
Hofbaur, Michael, et al., Modular Re-Configurable Robot Drives, Jul. 2010.
Brandstötter, Mathias, et al., Model-Based Fault Diagnosis and Reconfiguration of Robot Drives, Oct. 2007.

* cited by examiner

*Primary Examiner* — Jacob D Knutson
*Assistant Examiner* — Felicia L. Brittman
(74) *Attorney, Agent, or Firm* — Budzyn IP Law, LLC

(57) ABSTRACT

There is provided a drive assembly comprising: a reconfigurable differential drive comprising a first wheel and a second wheel, wherein the first and second wheels are moveable with different angular velocities around respective first and second rotation axes; a steering actuator configured to rotate the first wheel around a first pivot axis and/or the second wheel around a second pivot axis; wherein the first and second wheels are coupled such that a rotation of the first wheel around the first pivot axis by a first adjustment angle results in a rotation of the second wheel around the second pivot axis by a second adjustment angle, the second adjustment angle being dependent on the first adjustment angle.

16 Claims, 9 Drawing Sheets

SELECTIVELY RECONFIGURABLE DRIVE-ASSEMBLY

BACKGROUND OF THE INVENTION

Mobile robots are used for a wide range of applications, such as for logistic purposes. The drives of such robots require high flexibility with respect to possible movements of the robot whilst being very robust in terms of their operation. A so-called differential-drive, wherein two parallel wheels share a common axis represents a configuration that allows a robot to perform translational or circular movements depending on rotational velocities applied to its wheels whilst being very simple in terms of its mechanical structure. Conventional differential-drives, however, do not enable the autonomous robot to drive sideways. In order to imitate a sideways movement, the robot needs to perform a hybrid maneuver that combines a sequence of rotational movements and translational forward movements. This type of maneuver can be difficult to execute, in particular when the robot has to operate in confined spaces, which becomes highly relevant whenever the robot has to deliver an object close to a handling position, for example.

Known approaches to solve the above described problem relate to different shapes of the robot, for example a shape in which the diagonal dimension approximately equals the robot's length or width. Other approaches suggest independently steering and actuating different wheels of the robot. These approaches, however, require a plurality of actuators, motors or stability mechanisms which results in a complex drive arrangement that is cost intensive and difficult to control whilst being less robust during operation.

SUMMARY

According to the invention, there is provided a drive assembly comprising: a drive comprising a first wheel and a second wheel, wherein the first and second wheels are moveable with different angular velocities around respective first and second rotation axes; a steering actuator configured to rotate the first wheel around a first pivot axis and/or the second wheel around a second pivot axis; wherein the first and second wheels are coupled such that a rotation of the first wheel around the first pivot axis by a first adjustment angle results in a rotation of the second wheel around the second pivot axis by a second adjustment angle, the second adjustment angle being dependent on the first adjustment angle.

The above defined selectively reconfigurable drive assembly is based on the finding that by coupling the first and second wheels, only one steering actuator is necessary to perform the task of synchronously reconfiguring, both in time and angle, the rotations of the first and second wheels around the first and the second pivot axis respectively, i.e. to control a respective orientation of the first and the second wheel. Such a drive assembly extents the functionality of a differential-drive by allowing selective reconfiguration of the wheels, whilst providing a simple and robust steering mechanism. In other words: A selectively reconfigurable differential-drive assembly is provided. Furthermore, the capability to reconfigure the drive provides a fault-tolerant mode of operation. For example, one of the first and second wheels may be under-actuated or even free spinning. In this case, the drive can exhibit a controlled sideways movement by utilizing the operational wheel and the steering actuator only.

According to an embodiment, an absolute value of the first adjustment angle equals an absolute value of the second adjustment angle, in particular the first adjustment angle is the negative of the second adjustment angle.

Thus, the drive assembly allows for circular or sideward movements of a vehicle driven by the drive assembly without applying different angular velocities to the first and second wheels. Accordingly, the drive assembly enables the vehicle to perform agile movements in a confined driving area.

According to another embodiment, the first adjustment angle equals the second adjustment angle. In that manner, the drive assembly is enabled to precisely change the direction of a translational movement without the need of performing rotational movements. Furthermore, the orientation of the wheels can be reconfigured during a translational movement of the vehicle. For example, the orientation of the wheels can be changed without interrupting a purely translational movement of the vehicle.

According to another embodiment, the second adjustment angle is a function, in particular a linear function of the first adjustment angle. Thus, the second adjustment angle equals, for example, the sum of the first adjustment angle and an offset, the offset being dependent on the first adjustment angle. That is, the absolute values of the first and second adjustment angles may differ. For example, the first and second wheels may be rotated in the same direction but with different adjustment angles. Thereby, the drive assembly is configured to perform a greater variety of circular movements. In particular, the drive assembly is enabled to more precisely determine a rotational movement through guaranteeing a controlled centre of rotation at a finite distance from the drive assembly.

According to another embodiment, the steering actuator is configured to switch between a first mode and a second mode, wherein in the first mode, the second adjustment angle is a first function, in particular the negative of the first adjustment angle, and wherein, in the second mode, the second adjustment angle is a second function of the first adjustment angle, in particular equals the first adjustment angle.

Thereby, the drive assembly is enabled to adapt to specific mobility requirements. That is, in the first mode, the drive assembly allows for a steered circular movement by utilizing a common angular velocity of both wheels, and, in the second mode, the drive assembly allows for precise adjustments of the direction of a translational movement without changing the angular velocities of the wheels and without interrupting the translational movement.

According to another embodiment, the drive assembly further comprises at least one restoring means to apply a restoring force to the first and second wheels based on a rotation of the first wheel around the first pivot axis and/or a rotation of the second wheel around the second pivot axis with respect to an initial rotational position of the respective pivot axis.

Thereby, the drive assembly is configured to reset the first and the second wheel in their respective initial rotational position, i.e. their initial orientation in a differential-drive configuration, in case of a failure of the steering actuator of the drive assembly. In this case, the restoring means reset the first and second wheels in an initial position to perform standard differential-drive movements. Thus, the drive assembly is still enabled to move, using the remaining functional wheels, thereby providing a further fault-tolerant operation of the vehicle.

According to another embodiment, the restoring means is a mechanical means. Accordingly, a restoring mechanism, such a spring balancer or a hydraulic counterweight, is provided for a case in which the steering actuator fails, for example in which the power supply for the steering actuator is interrupted.

According to another embodiment, there is provided a vehicle, in particular an automotive vehicle comprising a drive assembly according any of the preceding claims.

BRIEF DESCRIPTION OF THE DRAWINGS

The present invention may be better understood from reading the following description of non-limiting embodiments, with reference to the attached drawings, wherein.

DETAILED DESCRIPTION OF THE PREFERRED EMBODIMENTS

Figure 1:
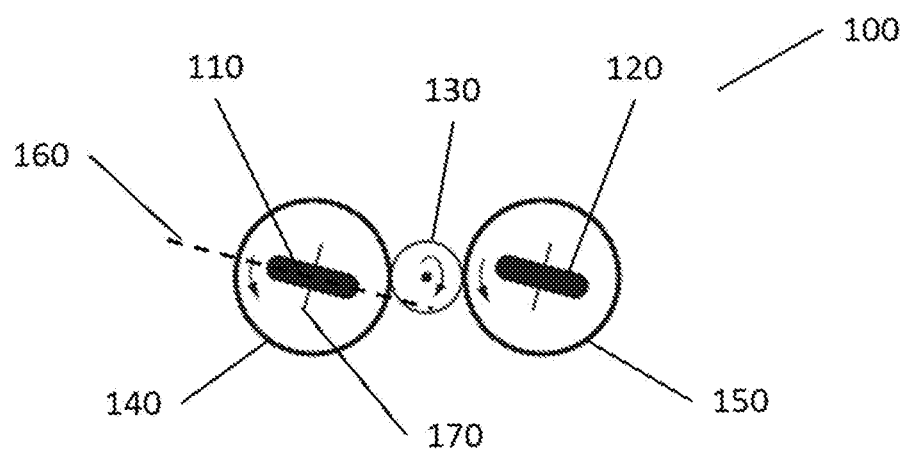
FIG. 1 shows a drive assembly in a first operation mode.

FIG. 1 shows a drive assembly 100 in a first operation mode, the drive assembly 100 comprising a first wheel 110, a second wheel 120 and a steering actuator 130. The first and second wheels 110 and 120 are arranged on rotatable platforms 140 and 150 respectively. The rotatable platforms 140 and 150 are rotatable around respective steering axes, e.g. first and second pivot axes that may coincide with the central axes of the rotatable platforms 140 and 150. The steering actuator 130 is coupled to the first and second rotatable platforms 140 and 150 or to the first and second pivot axes. The steering actuator 130 may be mechanically, hydraulically, electrically or magnetically coupled to the rotatable platforms 140 and 150 or to the first and second pivot axes. The mechanical coupling may be realised using gears or pull cables.

A rotation of the rotatable platforms 140 and 150 results in a rotation of the wheels 110 and 120 around the first and second pivot axis respectively. By rotating the wheels 110 and 120, their respective orientation is changed. The orientation of the wheels may be defined by an orientation axis 160 perpendicular to a rotation axis 170 and parallel to the longitudinal extent of the wheel or parallel to a locomotion plane of the drive assembly 100.

The steering actuator 130 is coupled to the rotatable platforms 140 and 150 or to the first and second pivot axes such that a rotation of the steering actuator 130 in a first direction results in a rotation of the rotatable platforms 140 and 150 in a second direction opposite to the first direction. In other words, a rotation of the steering actuator 130 around an axis of the steering actuator 130 by an angle having a positive value results in a rotation of the rotatable platforms 140 and 150 around respective steering axis by an angle having a negative value, the positive and negative values having the same absolute value. Put in yet another way, rotating, by the steering actuator 130, the first rotatable platform 140 by a first adjustment angle results in a rotation of the second rotatable platform 150 by a second adjustment angle, the second adjustment angle being a first function of the first adjustment angle. The first function may be a linear function, such as $\varphi_{II}=a\cdot\varphi_I$, or may be a quadratic function, such as $\varphi_{II}=a_2\cdot\varphi_I^2+a_1\cdot\varphi_I$, or may be a polynomial function of nth degree, such as $\varphi_{II}=\Sigma_{i=1}^{n}a_i\cdot\varphi_I^i$, wherein $\varphi_I$ is the first adjustment angle, $\varphi_{II}$ is the second adjustment angle, $a_i$ are real numbers and n is a natural number.

The steering actuator 130 shown in FIG. 1 may represent a coupling means of a steering actuator assembly, the steering actuator assembly being configured to rotate the wheels 110 and 120 around the respective steering axis by rotating the coupling means. The steering actuator 130 may couple other components of the steering actuator assembly or of the drive assembly 100 using mechanic, electric, hydraulic, magnetic or any other coupling means.

As shown in FIG. 1, only one steering actuator 130 is needed to control the orientation of the first and second wheels 110 and 120. Thus, the steering actuator 130 is configured to control the orientation of the first and second wheels 110 and 120 simultaneously in time and uniformly in angular change.

Figure 2:
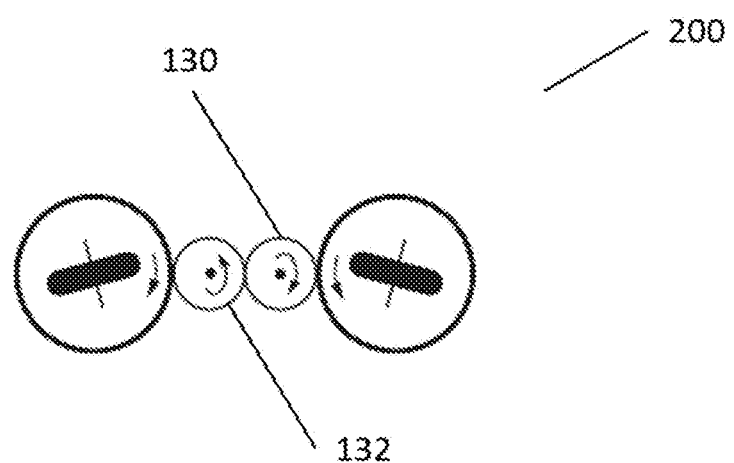
FIG. 2 shows a drive assembly in a second operation mode.

FIG. 2 shows a drive assembly 200 in a second operation mode. The drive assembly 200 is similar to the drive assembly 100 shown in FIG. 1. The same reference numerals are used for similar components. The drive assembly 200 comprises a steering actuator assembly, the steering actuator assembly comprising the steering actuator 130 and an additional coupling means 132. The additional coupling means 132 couples the first rotatable platform 140 or the first pivot axis to the steering actuator 130. The additional coupling means 132 may be designed similar to the steering actuator 130.

As shown in FIG. 2, the steering actuator 130 and the additional coupling means 132 couple the first and second rotatable platforms 140 and 150 such that a rotation of the steering actuator 130 in a first direction results in a rotation of the second wheel 120 in the first direction and results in a rotation of the first wheel 110 in a second direction opposite to the first direction. In other words, a rotation of the steering actuator 130 by an angle having a positive value results in a rotation of the additional coupling means 132 and the second rotatable platform 150 by an angle having a negative value. Further, the rotation of the steering actuator 130 by the angle having the positive value results in a rotation of the first rotatable platform 140 by the angle having the negative value, wherein the positive and the negative values may have the same absolute value. Put in yet another way, rotating, by the steering actuator assembly, the first wheel 110 around the first pivot axis by a first adjustment angle results in a rotation of the second wheel 120 around the second pivot axis by a second adjustment angle, the second adjustment angle being a second function of the first adjustment angle. The second function may be a function of the nth degree, such as $\varphi_{II}=-\Sigma_{i=1}^{n}a_i\cdot\varphi_I^i$, with $\varphi_I$ having a positive value, or may be an absolute value function such as $\varphi_{II}=-\Sigma_{i=1}^{n}a_i\cdot|\varphi_I^i|$, with $a_i$ being real numbers and n being a natural number, in particular with n being 1 or 2. The drive assembly 200 is thereby enabled to change the orientation of the first and second wheels 110 and 120 synchronously in time and in opposite directions.

Figure 3:
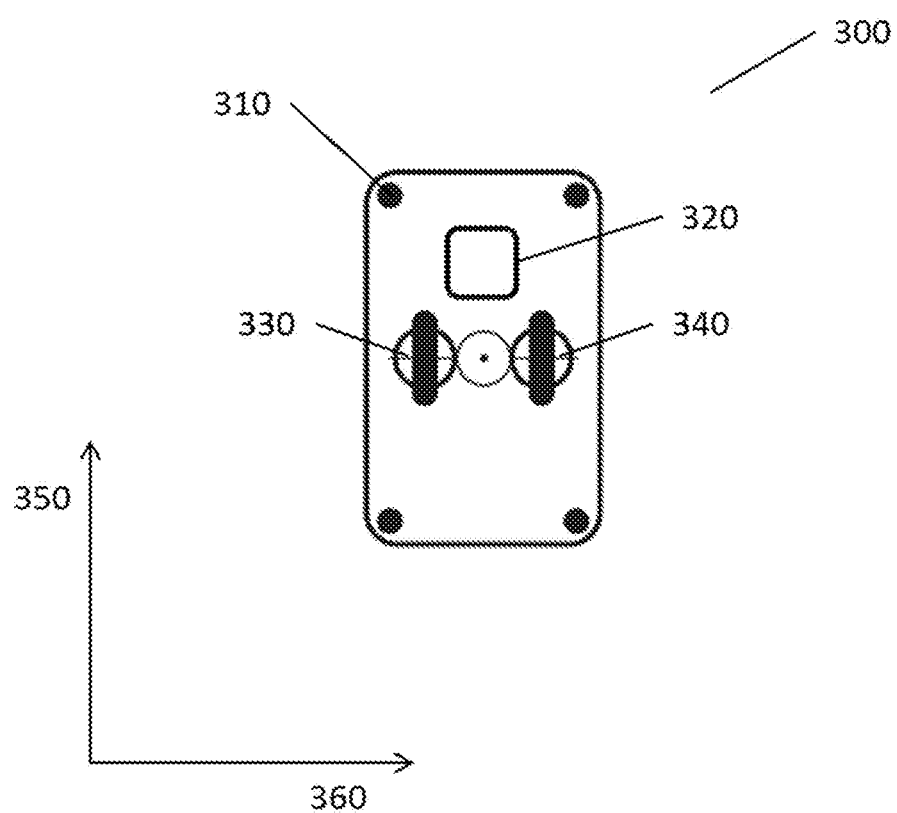
FIG. 3 shows a vehicle comprising a drive assembly in a first operation state of the first operation mode.

FIG. 3 shows a vehicle 300 comprising the drive assembly 100 shown in FIG. 1 in a first operation state of the first operation mode. The same reference numerals are used for similar components. The drive assembly 100 is arranged in the centre of the vehicle 300. The vehicle 300 further comprises support wheels 310 and a drive 320 actuating the drive assembly 100. The drive 320 may be comprised in the drive assembly 100 and is configured to rotate the first and second wheels 110 and 120 around respective rotation axes 330 and 340, similar to axis 170 shown in FIG. 1, in order to control the movement of the vehicle 300. In particular, the drive 320 is configured to rotate the first and second wheels 110 and 120 with the same angular velocity, such that the vehicle 300 is enabled to perform a translational movement in direction 350. In the shown operation state, the rotation axes 330 and 340 are parallel to each other. By rotating the rotatable platforms 140 and 150 around respective vertical steering axes, i.e. the first and second pivot axes, using the steering actuator 130 as described with reference to FIG. 1, the vehicle 300 is enabled to perform a translational movement in other directions, e.g. in direction 360 perpendicular to direction 350. The coordinate system depicting directions 350 and 360 may be related to the drive assembly 100, i.e. may rotate according to a rotation of the drive assembly 100.

The pivot axis of the first rotational platform 140 or the first wheel 110 and the pivot axis of the second rotational platform 150 or the second wheel 120 may be arranged perpendicular or substantially perpendicular to the respective rotation axis of the wheels 110 and 120. In other words, the pivot axes may be vertical steering axes arranged perpendicular or substantially perpendicular to the locomotion plane of the vehicle 300. Alternatively, the steering axes may be inclined with respect to the locomotion plane and/or with respect to the rotation axes of the first and second wheels.

The drive 320 is further configured to drive, i.e. rotate the first and second wheels 110 and 120 with different angular velocities. In that manner, the vehicle 300 is enabled to perform rotational movements, as described in more detail below with reference to FIGS. 6 to 7.

Figure 4:
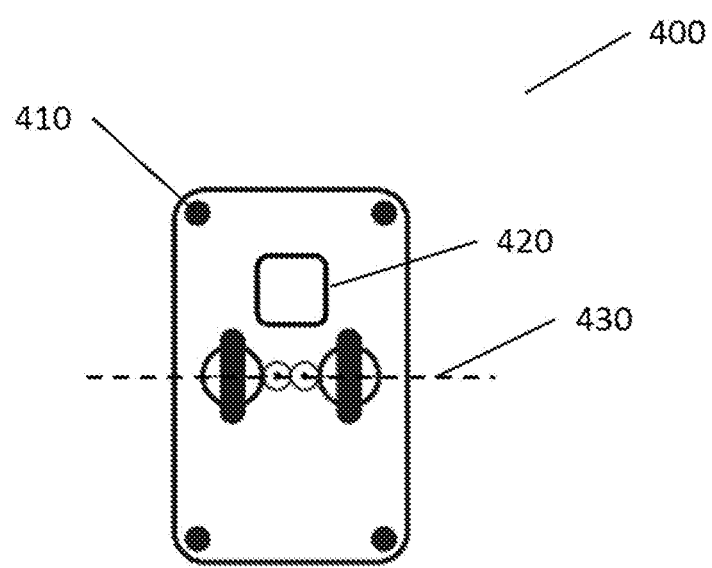
FIG. 4 shows a vehicle comprising a drive assembly in a first operation state of the second operation mode.

FIG. 4 shows a vehicle 400 comprising the drive assembly 200 shown in FIG. 2 in a first operation state of the second operation mode. The same reference numerals are used for similar components. Similar to the vehicle 300 shown in FIG. 3, the differential vehicle 400 comprises support wheels 410 that are rotatable around respective support wheel axes and a drive 420 configured to drive the wheels 110 and 120 with the same angular velocity or with different angular velocities. Similar to the vehicle 300, the vehicle 400 is configured to perform translational or rotational movements by driving the wheels 110 and 120 with the same or with different angular velocities and by controlling the orientation of the wheels 110 and 120. In the shown operation state, the wheels 110 and 120 share a common rotation axis 430. By rotating the rotatable platforms 140 and 150 around their respective pivot axes, using the steering actuator assembly as described with reference to FIG. 2, the rotation axes 330 and 340 can be arranged in a non-parallel way, such that the vehicle 400 is enabled to perform rotational movements without applying different angular velocities to the wheels 110 and 120, as described in more detail below with reference to FIG. 5.

The drive assemblies comprised by vehicle 300 shown in FIG. 3 and by vehicle 400 shown in FIG. 4 may be configured to switch between a first operation mode and a second operation mode. In both the first and second operation mode, a rotation of the first wheel 110 around the first steering axis by a first adjustment angle results in a rotation of the second wheel 120 round a second steering axis by a second adjustment angle. In the first operation mode, both wheels 110 and 120 rotate in the same direction, i.e. both adjustment angles are either positive or negative with respect to a common reference axis. In the second operation mode, the wheels 110 and 120 rotate in opposite directions, i.e. a rotation of the first wheel 110 by a positive adjustment angle results in a rotation of the second wheel 120 by a negative adjustment angle, and vice versa. In other words, the drive assembly 100 shown in FIG. 1 and the drive assembly 200 shown in FIG. 2 may be configured to switch between the steering actuator 130 coupling the first and second wheels 110 and 120, as shown in FIG. 1, and the steering actuator assembly comprising the steering actuator 130 and additional coupling means 132 coupling the first and second wheels 110 and 120, as shown in FIG. 2. Switching between the first operation mode and the second operation mode may be performed by a coupling mechanism, in particular by a gear coupling.

Figure 5:
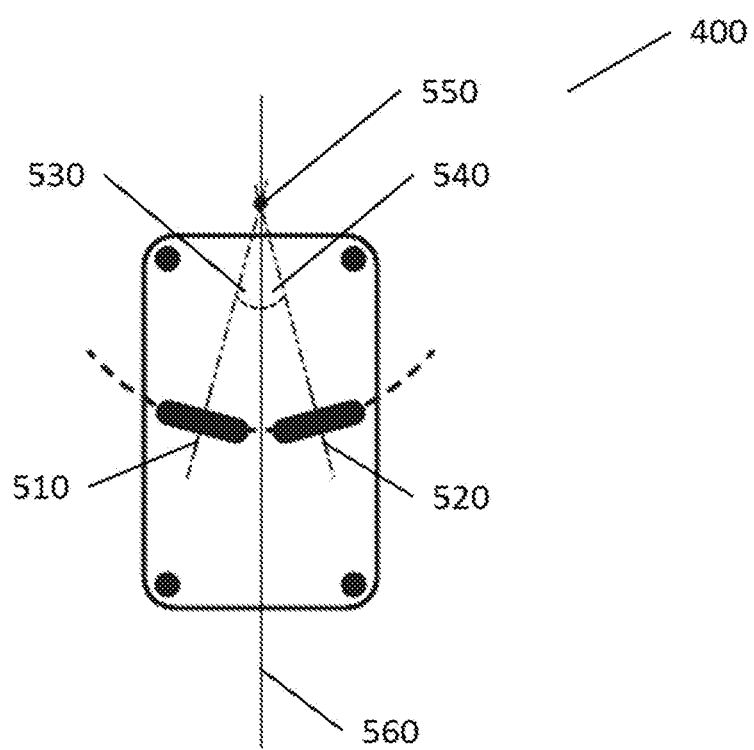
FIG. 5 shows a vehicle comprising a drive assembly in a second operation state of the second operation mode.

FIG. 5 shows the vehicle 400 in a second operation state of the second operation mode. The wheels 110 and 120 of the vehicle 400 are rotated such that the respective orientation axes of the wheels 110 and 120 are non-parallel to each other. In other words, the first and the second wheels 110 and 120 do not share a common rotation axis nor are the respective rotation axes 510 and 520 parallel to each other. Contrarily, the orientation of the rotation axes 510 and 520 respectively define first and second adjustment angles 530 and 540 having, in the shown operation state, the same absolute values. Thereby, the vehicle 400 is enabled to perform rotational movements without applying different angular velocities to the wheels 110 and 120. When a common angular velocity is applied to the first and second wheels 110 and 120, the vehicle 400 performs a rotational movement around an instantaneous centre of rotation, ICR, 550. The ICR 550 is defined by the orientations of the wheels 110 and 120, i.e. by the orientation of the respective rotation axes 510 and 520 or by the rotational positions of the first and second pivot axes. The first and second adjustment angles 530 and 540 may be defined with respect to a central axis 560, the central axis 560 being parallel to the locomotion plane of the vehicle 400 and being perpendicular to the common rotation axis 430 of the wheels 110 and 120 shown in FIG. 4. The ICR 550 is defined by the intersection of the first rotational axis 510 of the first wheel 110 and the second rotational axis 520 of the second wheel 120. In FIG. 5, the central axis 560 is chosen such that it contains the ICR 550, i.e. that the central axis 560 is situated in the middle of, i.e. is spaced from the first and second pivot axes with an equal distance.

The vehicle 400 may further be operated in a state in which the rotation axes 510 and 520 are parallel to each other, such that the wheels 110 and 120 share a common rotation axis. In another operation state, the rotation axes 510 and 520 may be arranged parallel to each other, such that the rotation axes 510 and 520 do not share a common rotation axis, i.e. that the ICR 510 lies at infinity. In this operation state, the vehicle 400 is enabled to perform a purely translational sideways movement.

Figure 6:
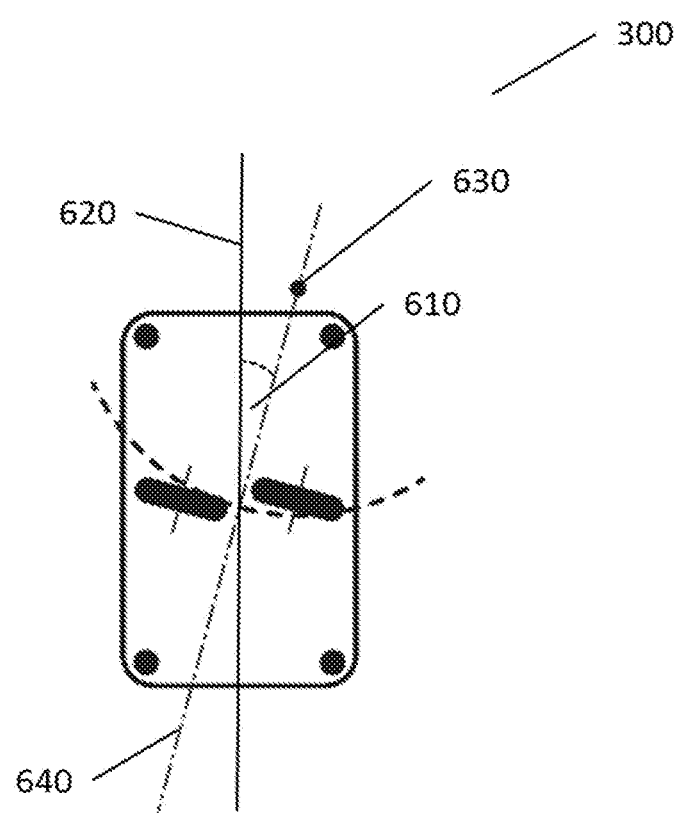
FIG. 6 shows a vehicle comprising a drive assembly in a second operation state of the first operation mode.

FIG. 6 shows the vehicle 300 in a second operation state of the first operation mode, in which the first and second wheels 110 and 120 are respectively rotated around the first and second pivot axes by an adjustment angle 610 with respect to a central axis 620 of the vehicle 300. When applying the same angular velocity to the first and second wheel 110 and 120 in the shown operation state, the vehicle 300 performs a purely translational movement in the direction defined by the orientation of the wheels 110 and 120, i.e. defined by the adjustment angle 610. However, by applying different angular velocities to the first and the second wheel 110 and 120, the vehicle 300 is enabled to perform rotational movements around an ICR 630, the ICR 630 being defined by the angular velocities applied to the first and second wheels 110 and 120 and/or by the adjustment angle 610. The ICR 630 lies on ICR axis 640, the ICR axis 640 being parallel to and equally spaced from the respective rotation axis of the wheels 110 and 120.

Figure 7:
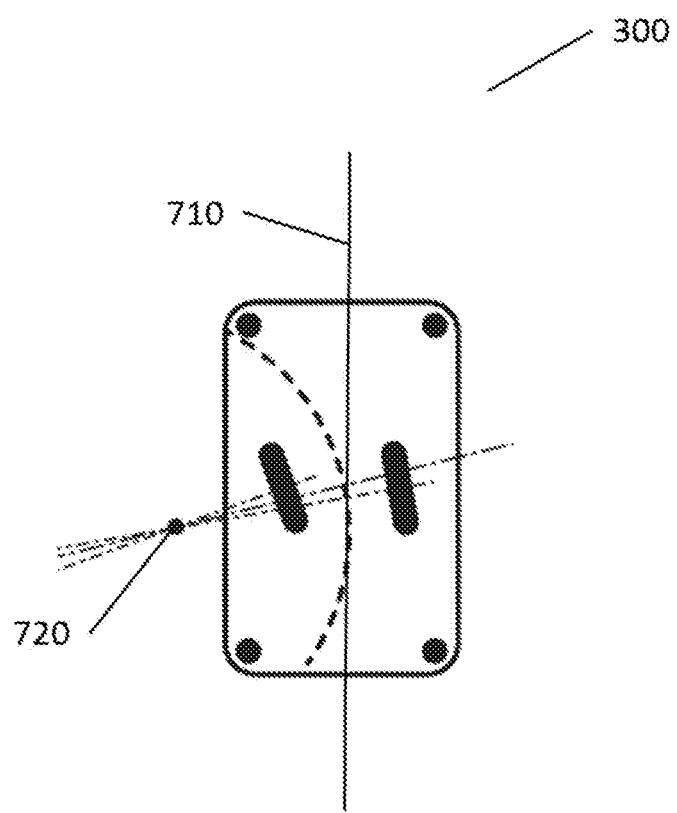
FIG. 7 shows a vehicle comprising a drive assembly in a third operation state of the first operation mode.

FIG. 7 shows the vehicle 300 in a third operation state of the first operation mode, in which the first wheel 110 is rotated around a first steering axis by a first adjustment angle in one direction and the second wheel 120 is rotated around a second steering axis by a second adjustment angle in the same direction, wherein the first adjustment angle differs from the second adjustment angle with respect to a central axis 710 of the vehicle 300. The first adjustment angle may be described as the sum of the second adjustment angle and an offset angular value. Therefore, in the shown operation state, the vehicle 300 performs circular, i.e. rotational movements around an ICR 720.

The rotational movement of the vehicle 300, i.e. the position of the ICR 720 is defined by the angular velocities applied to the first and the second wheel 110 and 120 and/or by the first and second adjustment angles, in particular by the offset angular value. More particularly, the rotational movement of the vehicle 300 may be fine-tuned by choosing an adequate dependency of the first adjustment angle on the second adjustment angle or vice versa. For example, the offset angular value may be a fixed value, or may be a function of the second adjustment angle. Generally speaking, the first adjustment angle may be a function of the second adjustment angle, in particular a linear, quadratic or polynomial function. Similar to the functional dependency of the first adjustment angle on the second adjustment angle described with reference to FIG. 7, the first adjustment angle 530 may be a function of the second adjustment angle 540 shown in FIG. 5.

Figure 8:
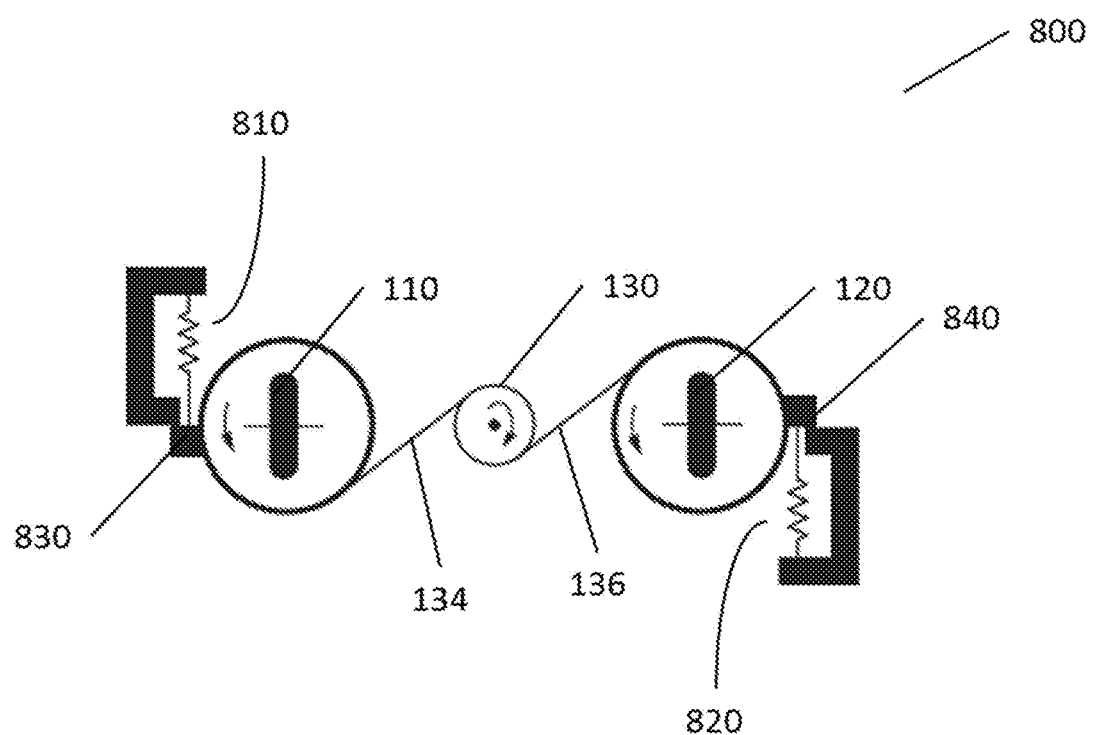
FIGS. 8-10 show restraint mechanisms configured to perform a re-orientation of the wheels of a drive assembly.
Figure 9:
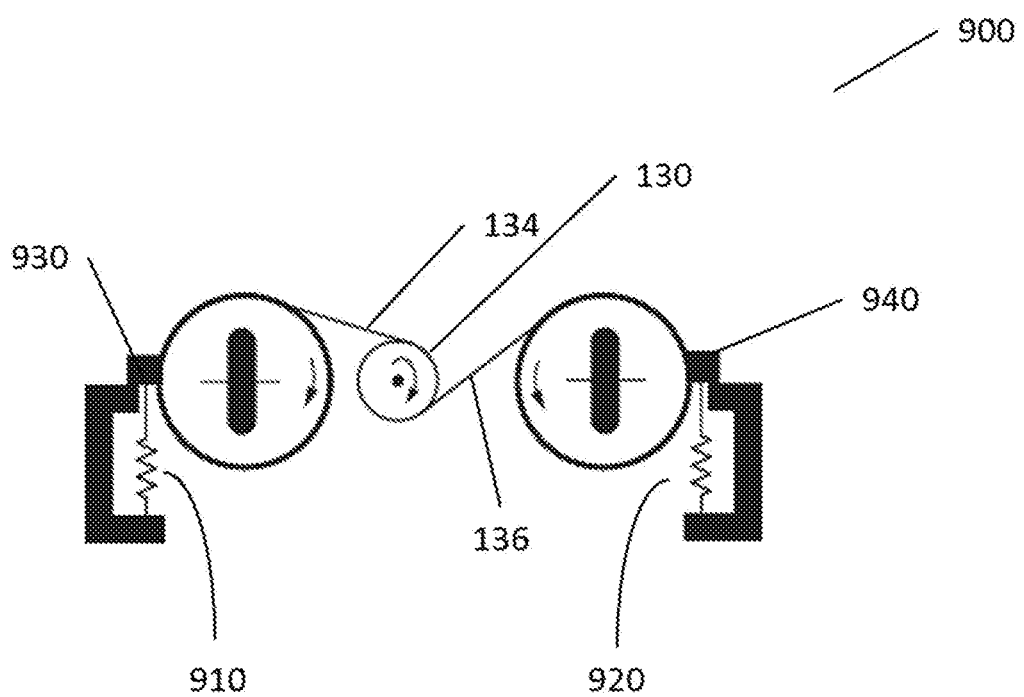
Figure 10:
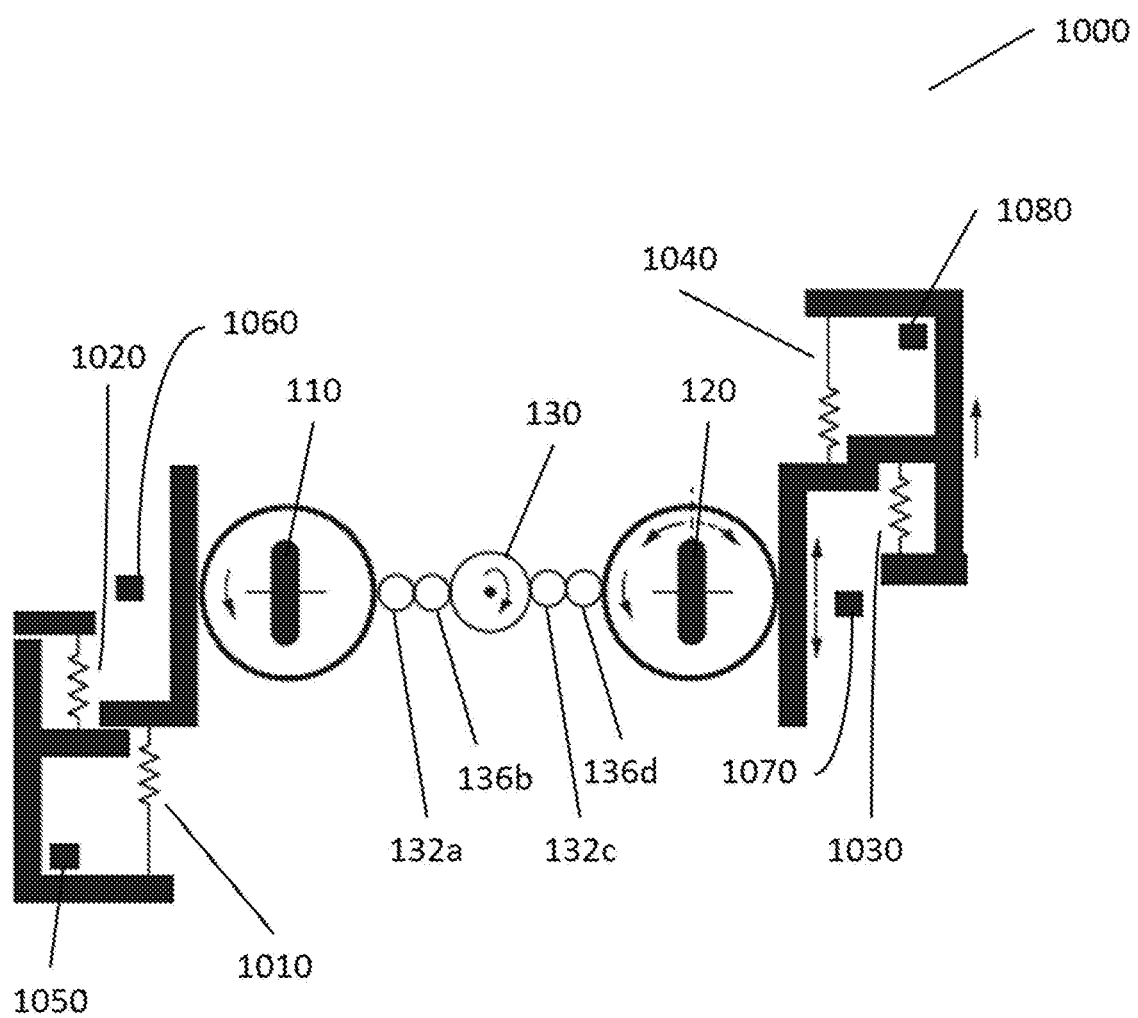

FIGS. 8 to 10 show restraint mechanisms configured to perform a re-orientation of the first and second wheels 110 and 120 into an initial rotational position of the wheels, e.g. into a differential-drive configuration in which the first and second wheels 110 and 120 share a common rotation axis perpendicular to the central axis 560 shown in FIG. 5 or the central axis 620 shown in FIG. 6. Alternatively, in the initial position, the rotational axes of the first and second wheels 110 and 120 are parallel to each other.

In particular, FIG. 8 shows a drive assembly 800, similar to the drive assembly 100 shown in FIG. 1, in an operation mode in which the first wheel 110 and the second wheel 120 are coupled by a steering actuator assembly comprising the steering actuator 130 and additional coupling means 134 and 136. The first and second wheels 110 and 120 are coupled such that a rotation of the first wheel 110 in a first direction performed by the steering actuator 130 results a rotation of the second wheel 120 in the first direction. The additional coupling means 134 and 136 may be wire ropes. In the example shown in FIG. 8, the first direction is counterclockwise i.e. left-turning. The static position of the wheels 110 and 120 shown in FIG. 8 represents the initial position of the wheels 110 and 120.

When the steering actuator is turned clockwise, i.e. in a right-hand direction, the rotational movement of the steering actuator 130 is transferred to the wheels 110 and 120 by the additional coupling means 134 and 136, resulting in a counterclockwise rotation of the first and second wheels 110 and 120. Thereby, the potential energy stored by restoring means 810 and 820 is increased. In the present example, the restoring means 810 and 820 comprise preloaded springs.

The restoring means 810 and 820 are configured to apply a restoring force to the first wheel 110 and/or the second wheel 120, the restoring force forcing the first and second wheels 110 and 120 back in their initial rotational position. The restoring force may be proportional to an adjustment angle of the first wheel 110 and/or the second wheel 120, in particular may increase with an increasing adjustment angle of the first wheel 110 and/or the second wheel 120 with respect to their initial rotational position. Alternatively, the restoring force may remain constant.

The drive assembly shown in FIG. 8 further contains restrain stops 830 and 840 configured to keep or reset the first and second wheels 110 and 120 in a precisely determined respective initial rotational position when no rotational movement of the first and second wheels 110 and 120 is performed by the steering actuator 130, e.g. due to a failure of the steering actuator. Thereby, a fault-tolerant operation of the drive assembly is achieved. The restrain stops 830 and 840 further allow the restrain means 810 and 822 to be preloaded, thereby allowing the drive assembly 800 to precisely adjust the rotational position of the first and second wheels 110 and 120, i.e. to precisely control the first and second adjustment angles.

FIG. 9 shows a drive assembly 900, similar to the drive assembly 200 shown in FIG. 2, in an operation mode in which the first wheel 110 and the second wheel 120 are coupled by a steering actuator assembly comprising the steering actuator 130 and the additional coupling means 134 and 136, such that a rotation of the first wheel 110 in a first direction performed by the steering actuator 130 results a rotation of the second wheel 120 in a second direction opposite to the first direction. In the example shown in FIG. 9, the first direction is clockwise, i.e. right-turning, whereas the second direction is counterclockwise, i.e. left-turning. The drive assembly 900 further comprises restrain means 910 and 920 as well as restrain stops 930 and 940 similar to the restrain means 810 and 820 and the restrain stops 830 and 840 shown in FIG. 8.

FIG. 10 shows a drive assembly 1000 comprising a steering actuator assembly, the steering actuator assembly comprising the steering actuator 130 and additional coupling means 132a-d. The steering operator 130 is configured to rotate the first wheel 110 in a first direction that is either clockwise or counterclockwise. The second wheel 120 is coupled to the first wheel 110 such that, a rotational movement of the first wheel 110 results in a rotation of the second wheel 120 in a second direction that is either clockwise or counterclockwise depending on the rotational direction of the first wheel 110.

The drive assembly 1000 further comprises restoring means 1010, 1020, 1030 and 1040 as well as restoring stops 1050, 1060, 1070 and 1080. The restoring means and restoring stops are configured to reset the first and second wheels 110 and 120 into an initial position after the first and second wheels 110 and 120 have been rotated around their respective steering axes. In particular, the restoring means and restoring stops shown in FIG. 10 are configured to reset the wheels 110 and 120 in their initial position regardless of whether the first and second wheels 110 and 124 clockwise or counterclockwise rotational movements.

The drive assembly 1000 may further be configured to switch between a first mode and a second mode, wherein in the first mode a rotation of the first wheel 110 in a first direction results in a rotation of the second wheel 120 in the first direction and, wherein in the second mode, a rotation of the first wheel 110 in the first direction results in a rotation of the second wheel 120 in a second first direction opposite to the first direction. The drive assembly 1000 may switch between the first mode and the second mode by selectively coupling in or out one or more of the additional coupling means 132*a-d*.

The invention claimed is:

1. A drive assembly comprising:
    a drive comprising a first wheel and a second wheel, wherein the first and second wheels are moveable with different angular velocities around respective first and second rotation axes;
    a steering actuator configured to rotate at least one of: the first wheel around a first pivot axis and the second wheel around a second pivot axis;
    wherein the first and second wheels are coupled such that a rotation of the first wheel around the first pivot axis by a first adjustment angle results in a rotation of the second wheel around the second pivot axis by a second adjustment angle, the second adjustment angle being dependent on the first adjustment angle, and
    wherein the drive assembly further comprises at least one restoring means to apply a restoring force to at least one of the first wheel and the second wheel based on at least one of: i) a rotation of the first wheel around the first pivot axis and ii) a rotation of the second wheel around the second pivot axis, with respect to an initial rotational position of the respective pivot axis.

2. The drive assembly according to claim 1, wherein an absolute value of the first adjustment angle equals an absolute value of the second adjustment angle.

3. The drive assembly according to claim 2, wherein the first adjustment angle is the negative of the second adjustment angle.

4. The drive assembly according to claim 1, wherein the first adjustment angle equals the second adjustment angle.

5. The drive assembly according to claim 1, wherein the second adjustment angle is a linear function of the first adjustment angle.

6. The drive assembly according to claim 1, wherein the steering actuator is configured to switch between a first mode and a second mode, wherein in the first mode, the second adjustment angle is a first function, and wherein, in the second mode, the second adjustment angle is a second function of the first adjustment angle.

7. The drive assembly according to claim 6, wherein in the first mode, the second adjustment angle is the negative of the first adjustment angle, and wherein, in the second mode, the second adjustment angle equals the first adjustment angle.

8. The drive assembly according to claim 1, wherein the restoring means is a mechanical means.

9. An automotive vehicle comprising:
    a drive assembly including:
        a drive comprising a first wheel and a second wheel, wherein the first and second wheels are moveable with different angular velocities around respective first and second rotation axes;
        a steering actuator configured to rotate at least one of: the first wheel around a first pivot axis and the second wheel around a second pivot axis;
        wherein the first and second wheels are coupled such that a rotation of the first wheel around the first pivot axis by a first adjustment angle results in a rotation of the second wheel around the second pivot axis by a second adjustment angle, the second adjustment angle being dependent on the first adjustment angle, and
        wherein the drive assembly further comprises at least one restoring means to apply a restoring force to at least one of the first wheel and the second wheel based on at least one of: i) a rotation of the first wheel around the first pivot axis and ii) a rotation of the second wheel around the second pivot axis, with respect to an initial rotational position of the respective pivot axis.

10. The automotive vehicle according to claim 9, wherein an absolute value of the first adjustment angle equals an absolute value of the second adjustment angle.

11. The automotive vehicle according to claim 10, wherein the first adjustment angle is the negative of the second adjustment angle.

12. The automotive vehicle according to claim 9, wherein the first adjustment angle equals the second adjustment angle.

13. The automotive vehicle according to claim 9, wherein the second adjustment angle is a linear function of the first adjustment angle.

14. The automotive vehicle according to claim 9, wherein the steering actuator is configured to switch between a first mode and a second mode, wherein in the first mode, the second adjustment angle is a first function, and wherein, in the second mode, the second adjustment angle is a second function of the first adjustment angle.

15. The automotive vehicle according to claim 14, wherein in the first mode, the second adjustment angle is the negative of the first adjustment angle, and wherein, in the second mode, the second adjustment angle equals the first adjustment angle.

16. The automotive vehicle according to claim 9, wherein the restoring means is a mechanical means.

* * * * *